No. 892,445. PATENTED JULY 7, 1908.
F. L. PARRILL.
ELECTRIC LIGHTING SYSTEM FOR AUTOMOBILES.
APPLICATION FILED OCT. 19, 1907.
2 SHEETS—SHEET 1.
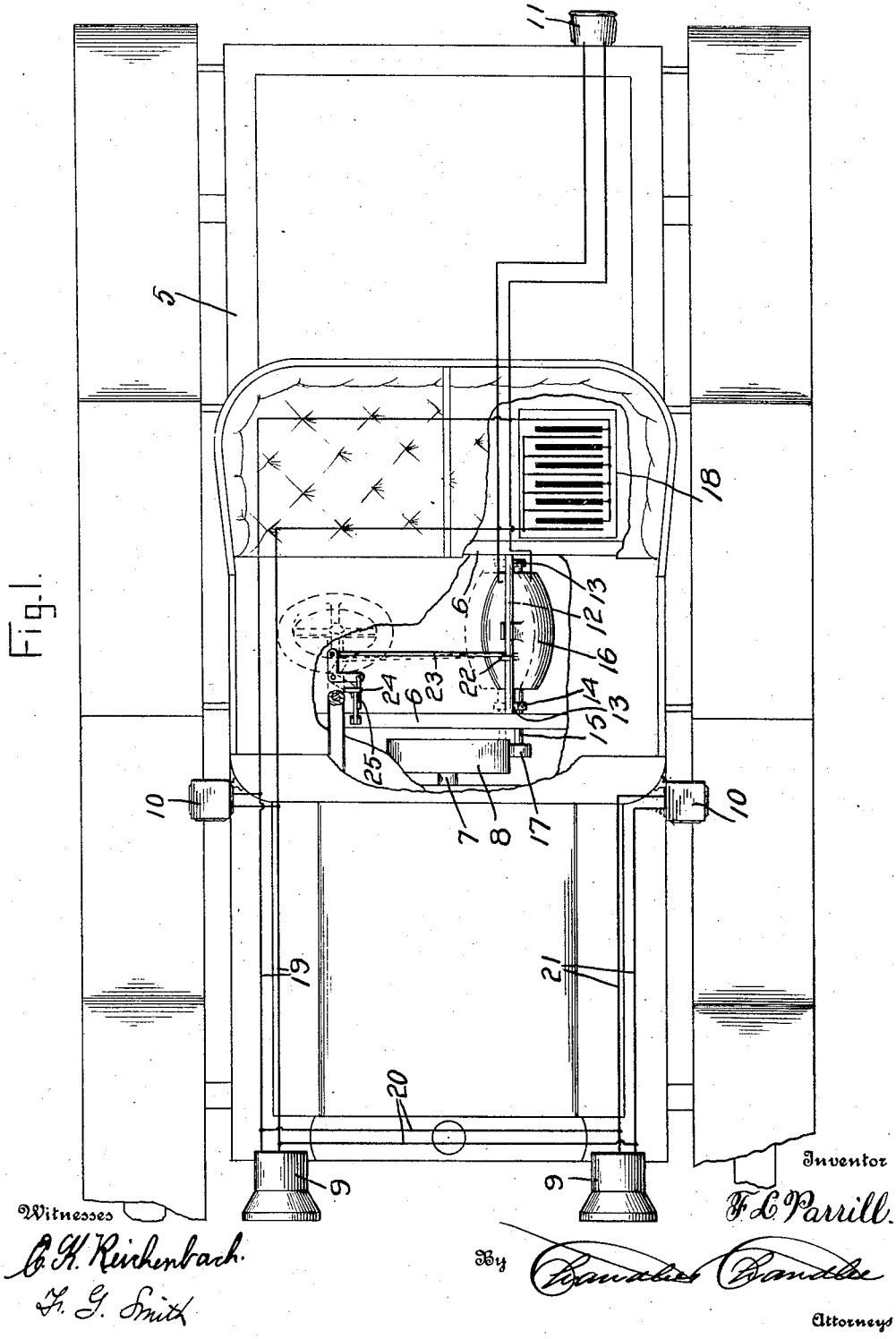

No. 892,445. PATENTED JULY 7, 1908.
F. L. PARRILL.
ELECTRIC LIGHTING SYSTEM FOR AUTOMOBILES.
APPLICATION FILED OCT. 19, 1907.
2 SHEETS—SHEET 2.
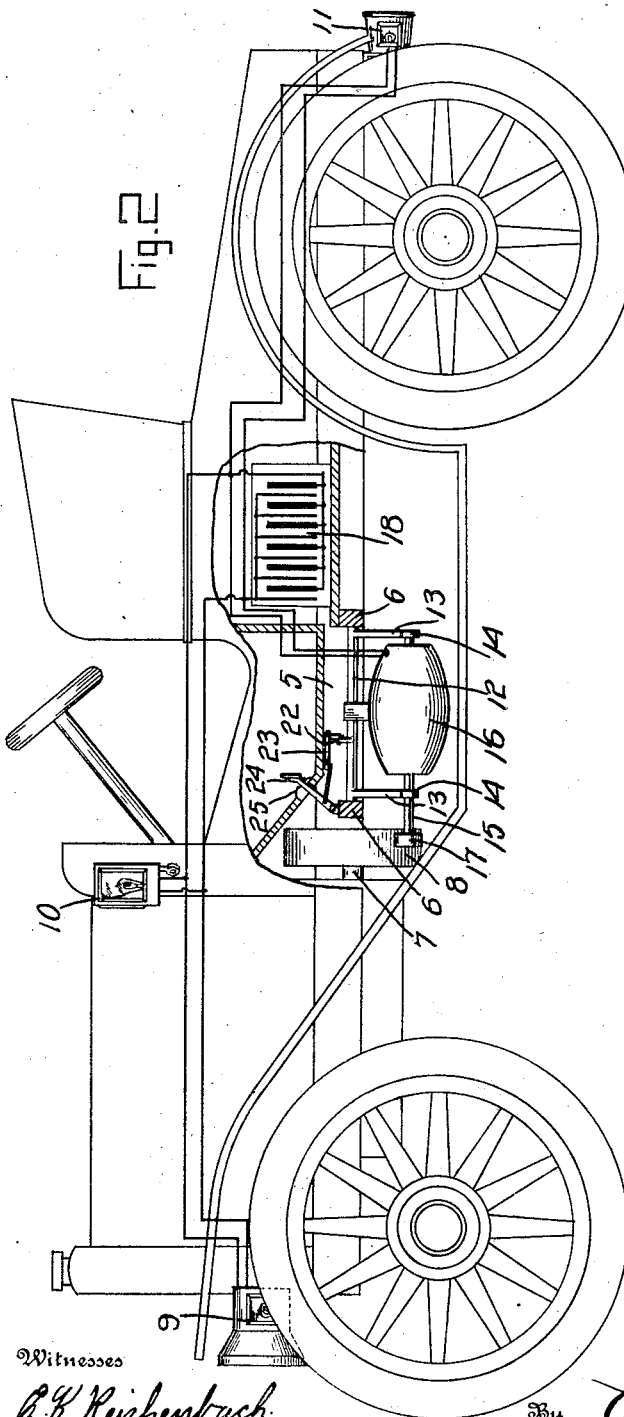
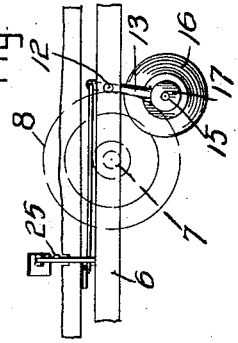
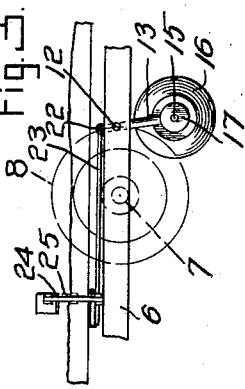
Witnesses
C. K. Reichenbach
F. G. Smith
Inventor
F. L. Parrill.
By
Attorneys

UNITED STATES PATENT OFFICE.

FRANK L. PARRILL, OF VINCENNES, INDIANA.

ELECTRIC-LIGHTING SYSTEM FOR AUTOMOBILES.

No. 892,445.　　　　Specification of Letters Patent.　　　Patented July 7, 1908.

Application filed October 19, 1907.  Serial No. 398,260.

*To all whom it may concern:*

Be it known that I, FRANK L. PARRILL, a citizen of the United States, residing at Vincennes, in the county of Knox, State of Indiana, have invented certain new and useful Improvements in Electric-Lighting Systems for Automobiles; and I do hereby declare the following to be a full, clear, and exact description of the invention, such as will enable others skilled in the art to which it appertains to make and use the same.

This invention relates to electric lighting systems for automobiles and has for its object to provide a simple system of this character of such construction that the dynamo for supplying such lights will only be operative during such time as the lights are needed.

In carrying out my invention I provide a dynamo which is mounted in a suitable frame hung in the bed frame of the car and a lever which has connection, by means of a connecting rod, with this hung frame whereby the dynamo may be swung laterally in a direction to and from the longitudinal middle of the car. Upon the dynamo shaft there is fixed a friction wheel which, when the dynamo is swung, together with its supporting frame, toward the middle of the car, contacts with the fly wheel whereby rotation of the fly wheel will result in operation of the dynamo to supply the current necessary to maintain the car lamps.

In the accompanying drawings, Figure 1 is a top plan view of an automobile showing the manner of mounting the dynamo and showing in dotted lines the position to which the dynamo is swung when it is desired to generate the light current, Fig. 2 is a vertical longitudinal sectional view through the said frame showing in side elevation the mounting for the dynamo, Fig. 3 is a vertical transverse sectional view through the frame showing, in front elevation, the manner of mounting the dynamo, the dynamo in this figure, being in inoperative position, and, Fig. 4 is a similar view but showing the dynamo and its frame swung to position to generate the light current.

In the drawings there is shown an automobile bed frame which includes side sills or beams 5 and the intermediate cross beams 6 which are positioned in parallel relation with respect to each other. As the engine or motor, transmission gear and etc., are all of the same construction, they will not be numbered or referred to. The engine shaft, however, is indicated by the numeral 7 and fixed upon this shaft is the usual fly wheel 8. The lights at the front of the car are indicated by the numeral 9, the side lights by the numeral 10 and the rear light by the numeral 11.

Journaled at its ends in the intermediate cross beams 6 of the bed frame of the car is a rock shaft 12 which forms a portion of the rocking frame in which the dynamo for generating the light circuit is mounted. The remainder of this frame consists of depending hanger arms 13 which are formed at their lower ends with bearings 14 in which the shaft 15 of the dynamo 16 is journaled. This dynamo is of the ordinary construction and fixed upon its shaft is a friction wheel 17 the function of which will be presently fully described, this friction wheel being located directly in a vertical plane with the fly wheel 8 upon the engine shaft. The storage battery employed in connection with the dynamo is indicated by the numeral 18 and is mounted upon the adjacent one of the side sills or beams 5 of the frame of the car. Wires 19, 20 and 21 lead to the lamps 9, 10 and 11 respectively and serve to transmit the light circuit thereto. Formed upon the rock shaft 12 substantially at its middle is a vertically extending arm 22 and connected to this arm is one end of a connecting rod 23 which rod connects at its opposite end a lever 24 which may be operated to rock the said shaft 12 and consequently the frame of which it forms a portion. This rocking of the frame in which the dynamo is supported serves to bring the friction wheel 17 into contact with the periphery of the fly wheel 8 upon the engine shaft thereby putting the dynamo into operation. In connection with the lever for operating the frame there is provided a foot operated pawl and ratchet device indicated by the numeral 25 which device serves as a means whereby the lever may be locked in position to hold the friction wheel in contact with the fly wheel.

What is claimed, is:—

1. In an electric lighting system of the class described, the combination with the frame of a motor car, the fly wheel for the motor thereof, and electric lights carried by the frame, of a frame mounted to rock transversely in the frame of the motor car, a dynamo having its shaft journaled in the rocking frame, a friction wheel fixed upon the said shaft, and means whereby the frame may be swung to bring the said friction wheel into contact with the fly wheel.

2. In an electric lighting system of the class described, the combination with the frame of a motor car, the fly wheel for the motor of the car, and electric lights carried by the frame of the car, of a rock shaft mounted in said car, hanger arms depended from said rock shaft, a dynamo having its shafts extended in bearings in the lower end of said arms, a friction wheel fixed upon the dynamo shaft, an arm formed upon the rock shaft, and a lever having connection with said arm whereby the frame may be rocked to bring the friction wheel into contact with the fly wheel.

3. In an electric lighting system of the class described, the combination with the frame of a motor car, the fly wheel for the motor of the car, and electric lights carried by the frame, of a light circuit generator hung within the frame and adapted to be rocked into operative relation to said fly wheel, and means whereby the said generator may be so swung.

In testimony whereof, I affix my signature, in presence of two witnesses.

FRANK L. PARRILL.

Witnesses:
S. T. LANGDON,
J. H. THOMPSON.